T. H. GARLAND.
CAR VENTILATING, REFRIGERATING, AND HEATING SYSTEM.
APPLICATION FILED OCT. 7, 1909.
978,284.
Patented Dec. 13, 1910.
4 SHEETS—SHEET 1.
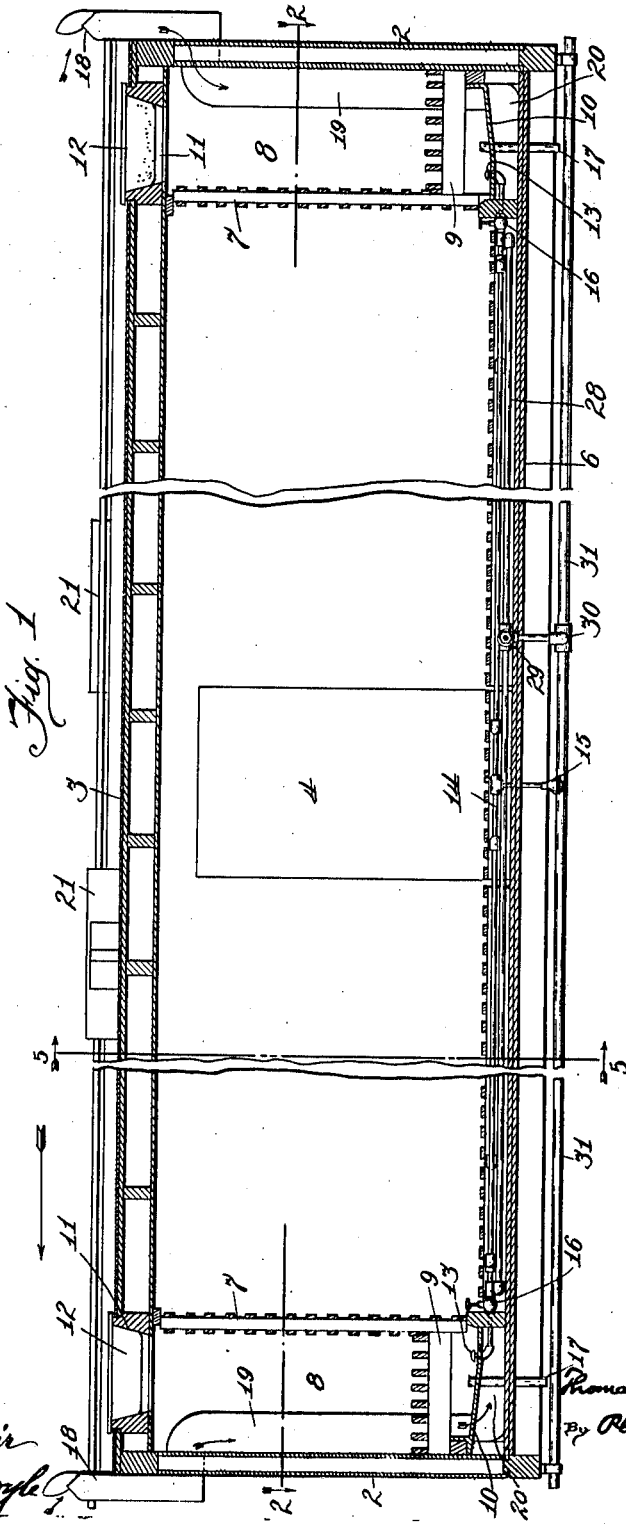

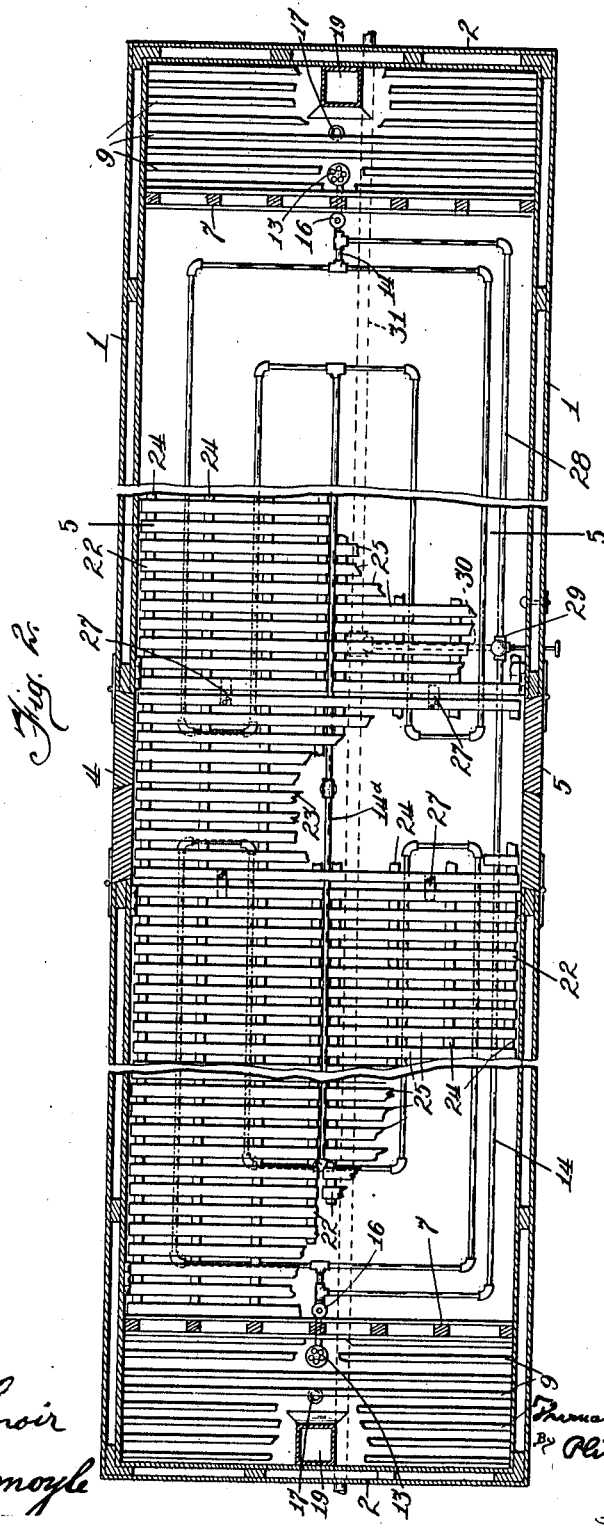

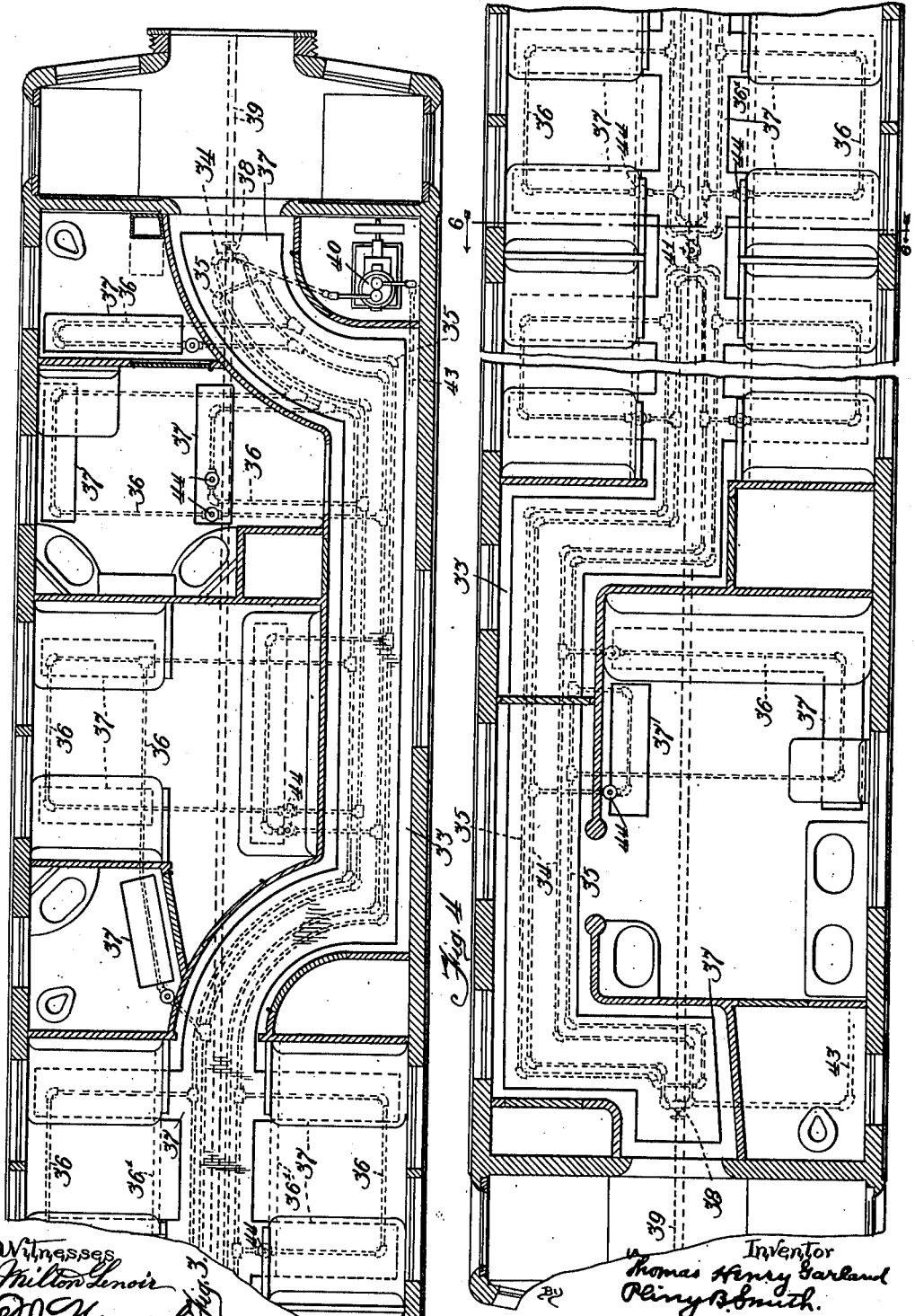

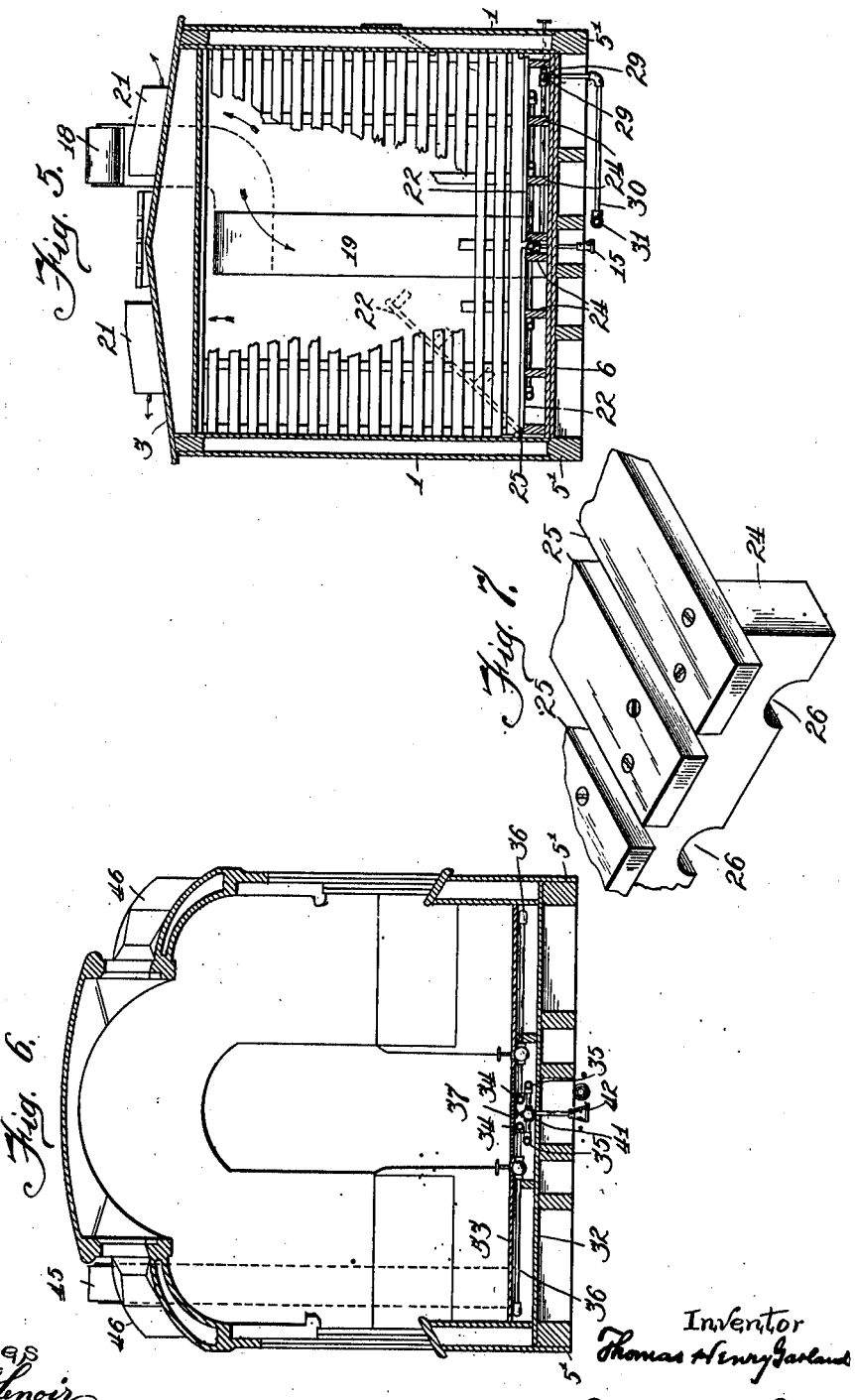

UNITED STATES PATENT OFFICE.

THOMAS HENRY GARLAND, OF CHICAGO, ILLINOIS.

CAR VENTILATING, REFRIGERATING, AND HEATING SYSTEM.

978,284.   Specification of Letters Patent.   Patented Dec. 13, 1910.

Application filed October 7, 1909. Serial No. 521,619.

*To all whom it may concern:*

Be it known that I, THOMAS HENRY GARLAND, residing at Chicago, in the county of Cook and State of Illinois, have invented certain new and useful Improvements in Car Ventilating, Refrigerating, and Heating Systems, of which the following is a complete, clear, full, and precise specification.

My invention relates to car ventilating, refrigerating and heating systems, particularly to systems for ventilating, cooling and heating railway cars.

The salient and important objects of my invention are to provide a circulating system which can be used for efficiently distributing either fresh air, heat, or a cooling medium; to provide cooling or heating medium distributing piping arranged at the bottom of a car between two floors between which there can be free unhindered circulation of air and through the upper floor of which there can be free and unhindered upward circulation into the body of the car; to provide improved means for supplying cooling or heating medium to the piping; to provide more efficient ventilating or draft mechanism for forcing air between the double flooring and about the piping and to cause upward circulation of the cooled or heated air through the car body and out at the top of the car; to provide means for utilizing all of the available cold units where ice is used as a source of cooling; to provide for better distribution of heat when steam is used for heating and to provide more efficient means for producing good circulation of heated or cooled air throughout the car as a whole or through any part or section thereof; to provide means for enabling the system to be quickly and readily connected for either heating or cooling purposes; to provide improved car construction for inclosing the piping yet allowing it to be readily accessible at any time; and in general to provide a system for refrigerating, heating and ventilating which can be easily handled and which gives the greatest efficiency without involving great cost.

In the accompanying drawings I have shown one embodiment of my invention applied to steam railway cars where steam from the engine or other source is available as a heating medium in the system and where ice or simple refrigerating machinery can be provided for producing a cooling medium with improved ventilating arrangement for proper distribution of heat or cold so produced.

In the drawings:—Figure 1 is a sectional view taken from a vertical plane passing through a car body, Fig. 2 is a sectional view of the car body taken on plane 2—2, Fig. 1, Fig. 3 is a plan view like Fig. 2, showing the arrangement in the right end of a passenger car, Fig. 4 is a similar plan view showing the arrangement in the left end of the passenger car, Fig. 5 is a sectional view taken on plane 5—5, Fig. 1, Fig. 6 is a sectional view taken on plane 6—6, Fig. 4, and Fig. 7 is a perspective view of a section of the flooring.

Figs. 1, 2, 5 and 7 illustrate the arrangement in a refrigerator or freight car. The car shown comprises the side and end walls 1 and 2 respectively covered by a roof structure 3. The side and end walls and the roof structure are preferably hollow to be filled with some temperature insulating material or with air so that any cold or heat generated in the car will be retained there- in as long as possible. In the side walls 1 entrance doors 4 and 5 of any suitable construction are provided. The floor supporting structure of the car comprises longitudinal sills or beams 5' which support the main flooring 6 which may be of several layers either close together or separated by temperature insulating material. Upon this main flooring is placed a second or upper slatted flooring hereinafter described. Adjacent the end walls 2 are removable vertical partitions 7 which may be of grille work or otherwise, forming ice compartments 8 with the end walls, a grille floor 9 being provided in the ice compartments for supporting the ice and for allowing drainage of water therefrom to pans 10 supported below the grille floors. Ice is delivered to the ice compartments through openings 11 provided through the roof and adapted to be sealed by lids 12.

Leading from the bottom of each pan 10 is an ice water intake 13 leading to one end of circulating piping 14, which piping passes back and forth over the floor 6 and which piping all slopes toward the center of the car and there connects with a water discharge trap 15. As shown in Fig. 2 the circulating piping is arranged in two symmetrical groups each group connecting with one of the intakes 13 and both groups connecting with common discharge pipe 14ᵈ which connects with the trap 15. The connection of each intake 13 with the piping is controlled by a valve 16. When these valves are open the ice water flows from the pans 10 into the intakes 13 and then ramifies through the piping 14 to be finally discharged through the trap 15. If the trap 15 should fail to discharge properly the overflow in the pans will be taken care of through overflow pipes 17 which will prevent the water in the pans from rising to a level at which the water would overflow into the car.

The air in the car has direct access with the ice in the ice compartments and is thus cooled. At each end of the car I provide an air intake 18 which extends above the roof of the car and on which is mounted an air gathering reversible hood. This air intake communicates with a duct or chute 19 leading down through the corresponding ice compartment and pan to the space 20 between the pan 10 and floor 6 below the ice compartment, this space having communication with the interior of the car through the slatted floor. On the roof of the car I provide one or more exhaust ventilators 21 which can be of a design as disclosed in my Patent No. 874320 dated December 17, 1907. As the car moves the intakes 18 will operate to divert air inwardly and downwardly to the space 20 between the two floors, while the exhaust ventilators 21 operate to cause outward flow of air from the car, the result being that air is forced inwardly and downwardly through the ducts or chutes 19 into the space 20, thence along between the floors of the car and then upwardly through and around the lading in the interior of the car and out through the exhaust ventilators 21; thus a constant circulation is maintained while the car is running. The same effect is produced when the car is standing still and a wind is blowing over the car. When ice is used the air in the car can come in direct contact with the ice in the ice compartments by virtue of the grille work partitions 7 or through the spaces provided above and below, when a closed bulkhead is used, and the circulation referred to will agitate the air in the car and in the ice compartments to cause thorough mixing thereof and there will be uniform cooling of the air in the car. The air coming in through the chutes 19 will pick up the cooled air near the floor of the car adjacent the piping 14 and will carry this cool air upwardly. Thus there is no chance for air stagnation in any part of the car, but there will be thorough agitation and mixture of the warmer with the cooler air so that the car will be uniformly cooled throughout. Not only is the cold utilized which results from melting of the ice, but all the cold units are extracted from the ice water, the ice water being circulated back and forth across the car floor along a sufficient radiating surface so that the cold units are all extracted by the air taken in through the intakes 18. During a large part of each year fruits, vegetables and other perishable property are transported in refrigerator or insulated cars without the use of ice or heat, very effective ventilation only being required to carry off the heat and gases generated by the fruit, vegetables or other lading in the car. My arrangement is very effective in producing strong currents of air down through the ducts or chutes to the space between the floors, thence up, through and around the lading and out through the ventilators on the roof, carrying with it the heat and gases given off by the lading in the car.

The upper or slatted flooring consists of a plurality of sections which can be readily moved at any time to give access to the piping. As shown in Figs. 2 and 5, this flooring comprises a number of longitudinal sections 22 hinged at their outer edges to the car sides and whose inner edges meet along the center line of the car when the sections are brought to horizontal position. The section 23 between the doors 4 and 5 is not hinged but is automatically locked in place when the adjacent swinging sections are moved to their horizontal position, the floor section 23 having side lugs 27 which are engaged by the adjacent swinging sections 22 so that the middle section 23 is held in place when the swinging sections are lowered. Each of the floor sections is built up of a number of longitudinal stringers or bars 24 connected together by transverse floor strips or boards 25 which are separated a sufficient distance to give proper circulation from the space between the floors to accommodate the upward flow of cold or warm air from said space up, through and out at the top of the car. The lower edges of the strips 24 have ventilating notches or openings 26 which allow transverse circulation along the car floor so that the incoming air can freely move along the car floor and adjacent piping 14. These floor sections form a strong and rigid floor which will support the freight but which will allow sufficient circulation of air between the floors and also upwardly into the car body.

In warm weather certain freight would have to be cooled, whereas in cold weather the car would have to be warmed to prevent freezing of the freight, and with my arrangement the piping can be disconnected from the cold supplying sources and can be connected with heat supplying sources. Referring to Fig. 2, the outer ends of the piping 14 are connected together through a pipe 28 in which is interposed a valve 29 having connection through pipe 30 with the train pipe 31 which connects with the locomotive boiler or with some other source for supplying steam or other heating medium. When the refrigerating system is to be used this valve 29 is adjusted to disconnect the heat pipe 31 from the piping 14 and valves 16 are opened to connect the piping with the ice compartments whereupon the cold water will circulate and the air currents controlled to cause cooling of the car. If it is desired to heat the car valves 16 are closed and valve 29 opened so that steam can flow from piping 31 into piping 14 to heat the car, proper circulation and uniform heat distribution being obtained by the proper adjustment of ventilating devices placed on top of the car or elsewhere. If steam is used as a heating medium the water of condensation will escape through the trap 15 which may be of any well known construction to allow escape of water and to prevent the escape of steam. Thus a car with my equipment can be readily and quickly changed from a refrigerating car to a heating car and refrigeration and heating will be attained with equal efficiency.

In Figs. 3, 4 and 6 I have shown a modified arrangement of piping and connections for adapting a sleeping car or passenger coach to be either heated or cooled. The arrangement of the various berths, apartments, wash rooms and corridors in sleeping cars is well known. The floor, however, of the car is double and comprises the lower floor 32 and the upper floor 33 to leave a hollow space for accommodating the circulating piping. As shown in Figs. 3 and 4 the piping comprises supply and returning sections 34 and 35 which sections are bridged by coils 36 situated at desired places. As shown, one or more of these coils are placed in each compartment and one or more branches pass through each seat section or berth compartment. The top floor 33 has grille or grated sections 37 extending along the places where it is desired to have heat or cold supplied. As shown, the grating extends along the corridor of the car and branches into each seat section over the piping branches or coils so that the heat or cold from these coils can readily reach the places intended. As shown, the coils in the seat sections extend below the seats, and grating sections are also provided under the seats so that heat or cold can rise from the coils and pass into the seat sections as desired.

By means of valves 38 the ends of the supply sections 34 of the piping can be connected either with the train pipe 39 which supplies the heating medium or with an artificial cold producing machine such as an ammonia condenser 40 or an ice tank. The inner ends of the return piping sections 35 connect with a three-way valve 41 which in one position connects the inner ends of sections 35 with a steam trap 42 and which in its other position will disconnect the trap and will merely connect the ends of sections 35 together. If it is desired to heat the car valves 38 are actuated to disconnect the ammonia condenser and to connect the heat pipe 39 with the supply piping 34, and valve 41 is turned to connect the return sections 35 with the steam trap 42. Steam will, therefore, enter both ends of the sections 34 through the valves 38 and will circulate through the various heating sections and coils to the return sections 35 from whence all water of condensation will escape through steam trap 42. If it is desired to cool the car valves 38 are actuated to disconnect the piping from the steam pipe 39 and to connect the supply piping 34 with the outlet of the ammonia condenser. This connection of the condenser in the arrangement shown may be with one end of the supply section 34 as shown in Fig. 3 and the return pipe 43 to the condenser connected with the left end of the piping section 34, as shown in Fig. 4. Valve 41 is also set to disconnect the steam trap and to connect together the inner ends of sections 35. Cooling medium will flow from the condenser into the right end of the supply piping section 34, then through the various heating units or coils back and through the return pipe 43 from the left end of the piping section 34. Thus by merely setting a small number of valves the circulating piping system can be adapted for receiving either heating or cooling medium. Heating and cooling can be localized as desired as each heating unit or coil is provided with an individual valve 44. Partitions 36′ can be provided between the floors under the berths so that the berths can be more readily heated or cooled individually. The heat or cold from the piping will also circulate between the upper and lower floors and will distribute itself through the car by virtue of the grating sections. This distribution of the heat or cold can be forced and better regulated by means of suitable air intakes and outlet ventilators 45 and 46 which operate in the same manner as described in connection with the system illustrated in Figs. 2 and 5.

The piping can be arranged in any manner along the car floor to give the necessary radiation surface and to lead the heating or cooling medium to the places desired. Instead of valves for controlling the sections of the piping for heating or cooling, permanent connections or rearrangement of the piping could be made whenever it is desired to change from heating to cooling or vice versa. Any number of valves could also be provided to give any combination of connections. I do not, therefore, wish to be limited to the exact arrangement of the piping shown, the main feature of my invention being to provide a piping arrangement which can be readily and quickly adapted for receiving either cooling or heating medium, this piping being arranged to be accessible and in position so that the greatest percentage of heat or cold units can be extracted therefrom by proper circulation of air which is to be cooled or heated.

I therefore desire to secure the following claims by Letters Patent.

1. In a temperature controlling system, the combination of a compartment whose temperature is to be controlled, circulating conductors arranged along the floor of the compartment, means for connecting said conductors to receive and to circulate either heat or cold producing medium, ventilating mechanism for deflecting air flow to the spaces immediately surrounding said conductors, and additional ventilating mechanism for causing upward flow of the air from said spaces and through the compartment.

2. In a temperature controlling system for controlling the temperature in a moving vehicle, the combination of circulating piping arranged along the floor of the vehicle, a heat producing source for the vehicle, a cold producing source for the vehicle, means for adapting said piping to be connected either with said heat or cold producing source, air circulating mechanism controlled by the movement of the vehicle for deflecting air into the vehicle and for causing the air to flow adjacent said piping to be affected by the temperature of said piping, and additional circulating means controlled by the movement of the vehicle to cause flow of the air from said piping and upwardly through the vehicle.

3. In a refrigerating car, the combination of piping extending back and forth along the car bottom, ice receptacles at the ends of the car, means for causing the water of the ice to circulate through said piping, and means controlled by the movement of the car for causing circulation and mixing of the air directly cooled by the ice within the ice compartments and the air cooled by contact with said piping with the air in the car to thereby cause uniform cooling of the car.

4. In a railway car, the combination of double floors forming a space at the bottom of the car, main supply piping extending through said space and adapted for receiving either a heating or a cooling fluid, piping branches leading from said main piping to supply various sections of the car, and valves for controlling the connections of said piping branches with the main piping.

5. In a railway car, the combination of an upper and a lower floor forming between them a shallow space, said upper floor having openings for connecting said space with the interior of the car, piping arranged in said space for circulating heating or cooling medium through said space, and means for causing the circulation of air through said space and upwardly through the top floor into the interior of the car, said top floor being in the form of hinged sections adapted to be swung upwardly away from said piping.

6. In a railway car, the combination of piping extending back and forth along the floor of the car for circulating cooling or heating medium, a plurality of longitudinally extending slatted sections hinged at the sides of the car to be swung upwardly from the center of the car, a middle slatted section extending transversely across the car, said slatted sections forming a protective floor over said piping, and means whereby said middle section is locked in place when the longitudinal sections are swung downwardly in the horizontal position.

7. In a railway car, the combination of double floors forming a space along the bottom of the car interior, there being passageways through the top floor for connecting said space with the car interior, intake ducts at the exterior of the car having connection with said space whereby air is forced through said ducts and through said space to be distributed into the car interior when the car is in motion, and exhaust outlets at the top of the car for causing upward circulation through and expulsion of air from the car.

8. In a compartment to be tempered, the combination of separated upper and lower floors, partitions dividing the space between said floors into sections, the upper floors above said sections being perforated, main piping extending through the space between said floors and adapted for circulating either cooling or heating medium, branch piping extending from the main piping into the sections formed by the partitions and below the perforations leading from said sections whereby tempered air can circulate upwardly from the sections, and means for individually controlling the connection of the branch pipings with the main piping.

In witness hereof, I hereunto subscribe my name this 4th day of October A. D. 1909.

THOMAS HENRY GARLAND.

Witnesses:
M. A. MAYO,
D. J. NORMOYLE.